United States Patent [19]

Kato

[11] 3,975,706
[45] Aug. 17, 1976

[54] ABNORMALITY-DETECTING DEVICE IN A BRAKE SYSTEM
[75] Inventor: Takayuki Kato, Aichi, Japan
[73] Assignee: Kabushiki Kaisha Toyota Chuo Kenkyusho, Nagoya, Japan
[22] Filed: May 1, 1974
[21] Appl. No.: 465,821

[30] Foreign Application Priority Data
May 4, 1973  Japan............................ 48-49963

[52] U.S. Cl............................ 340/52 A; 188/1 A; 200/61.4; 340/57
[51] Int. Cl.²........................................ B60T 17/22
[58] Field of Search.................. 340/52 A, 52 B, 69, 340/258 C, 269, 57; 324/34 TE, 34 TK, 40; 200/61.4, 61.44; 188/1 A

[56] References Cited
UNITED STATES PATENTS
3,252,084  5/1966  Krobath............................... 324/40
3,441,840  4/1969  Randle............................. 324/34 TK
3,454,874  7/1969  Young............................. 324/34 TK
3,513,555  5/1970  Vachon........................... 324/34 TK
3,594,721  7/1971  Frenkel et al....................... 340/52 A
3,674,114  7/1972  Howard............................... 188/1 A
3,808,593  4/1974  Kopernik et al.................... 340/52 A Primary Examiner—John W. Caldwell
Assistant Examiner—Joseph E. Nowicki
Attorney, Agent, or Firm—Spensley, Horn & Lubitz

[57] ABSTRACT

Abnormality-detecting device of very compact structure for particular use in the vehicle brake system for detecting the amount of wear in the brake lining element and temperature rise in the brake system. Cumulative reductions in the effective thickness of the lining element are detected by measuring the coil inductance variation by a pick-up coil fixed to the brake shoe said coil also detects occurrence of a critical temperature rise in the brake system.

19 Claims, 14 Drawing Figures

ABNORMALITY-DETECTING DEVICE IN A BRAKE SYSTEM

BACKGROUND OF THE INVENTION

1. Field of the Invention

This invention generally relates to an abnormality-detecting device for use in a brake system of an automotive vehicle. More particularly, it relates to a device for continuously or intermittently detecting thickness displacement of the frictional braking element or lining of the brake shoe by detecting said displacement as coil inductance variation through a pick-up coil secured to the brake shoe, and also for detecting a critical temperature rise in the brake system by converting temperature changes into electrical signal potential changes through the same coil.

2. Description of the Prior Art

In general, for measurements of spatial distance (gap) or length there have been known various devices such as mechanical measurement devices, electrical measurement devices, optical measurement devices, etc. For the ordinary measurements, these measuring systems of the prior art are satisfactory in use and performance.

However, these conventional measuring devices are usually arranged separately from or independently of the object to be measured, and only when the measurement is made, the device is temporarily applied to the object to be measured, or the object to be measured is applied to the device. The reasons for the necessity of such arrangement are primarily that the conventional measuring devices are generally of complex structure, the devices themselves are of large-size, and still more they tend to be subject to external disturbances such as undesirable vibrations and the like that may cause a lowering of the measuring accuracy.

Accordingly, with the measuring devices of the prior art, there has been encountered such a difficulty that when an object to be measured is incorporated in machinery, for example, as its component part, it takes many hours, with the machinery being inconveniently held out of operation, to complete measuring the distance (or gap) or length in connection with the object. A further drawback has been that during the running of machinery, it is not possible to detect the rate or type of changes occurring in the distance or length. Particularly, it has been extremely difficult to detect the distance or length between moving members.

In various kinds of machinery or equipment, it is frequently necessitated during the operation to carry out measurements of an object or objects with respect to the distance or length, whether such object constitutes machinery itself or a component part incorporated therein. One example is the measurement of the amount of wear of the lining element in an automotive vehicle brake system.

As well known, the automobile brake system is mounted in the wheel tire, and generally is of the drum-type or disk type. It is commonly so arranged, in either type, that the braking action be effected by exertion of a frictional force produced by pressing the brake lining element secured on the shoe against the brake drum. In view of assuring a safe drive by car, the brake system imperatively needs to provide a consistently satisfactory quality of braking effect. Though there are various factors causing deterioration of the braking effect, the primary one resides in wear of the brake lining due to long use of the brake system. Therefore, the detection of the amount of wear in the brake lining whenever desired is essentially necessary for assurance of a safe drive by car. However, with the conventional brake system mounted in the wheel, it has been extremely hard to detect the amount of wear in the brake lining element. The common practice has hitherto been that on the occasion of overhauling the automobile, the wheel tire assemblies are dismantled, and then the amount of wear in the lining element is measured. This requires much time and labor. Therefore, the ordinary brake system has a serious defect in that during the normal driving conditions of the automobile it is not possible to detect the wear of the brake lining.

There has been known the conventional device in that a sensor means such as a micro-switch or the like is operatively associated with piston means for actuating the brake shoe so that an alarm signal is generated when the amount of wear of the lining reaches a predetermined limit. Nevertheless, this device also involves a fault in that only a critical amount of wear can be detected and there is no sensing or knowing the presently effective thickness of the brake lining whenever desired, and its construction being rather complicated.

SUMMARY OF THE INVENTION

A primary object of the present invention is to provide an abnormality-detecting device for use in a vehicle brake system which device overcomes the prior art drawbacks so far described and detects the effective thickness and the wear amount of a frictional braking element even while the vehicle is driven.

Another object of the invention is to provide an abnormality-detecting device of the type specified which is capable of continuously detecting the thickness displacement in the frictional braking element as electric signals, without having any resultant influence upon the normal operational function of the brake system itself.

Still another object of the invention is to provide an abnormality-detecting device of the type specified which not only detects the effective thickness and hence the wear amount of the frictional braking element in the brake system, but also indicates the occurrence of such an emergency of the type that the temperature of the brake system rises to a critical level which causes failure in the brake performance, thereby to assure a safe drive by car.

According to the invention, the abnormality-detecting device principally comprises: a resonance circuit consisting of a pick-up coil wound about a core made of a thermomagnetic material secured to the brake shoe together with the pick-up coil and a capacitor in parallel connection to said pick-up coil; a high frequency oscillation circuit for generating a predetermined constant frequency which is identical to a resonant frequency provided by said resonance circuit when the brake system is under normal conditions in terms of the effective thickness of the braking frictional lining element and also temperatures in the brake system; a displacement-sensing circuit comprising a circuit for detecting a displacement voltage and a detector circuit interconnecting said oscillation circuit and resonance circuit, which converts inductance changes in said pick-up coil into electric signals; a comparator circuit which compares the output of said displacement-sensing circuit with a predetermined reference value and applies displacement signals to a display means; and an alarm circuit which sends out alarm signals when the output of the displacement-sensing circuit exceeds a predetermined value.

The above and other objects and features of the invention will fully be understood by reference to the following description taken in connection with the accompanying drawings.

DESCRIPTION OF THE PRESENTLY PREFERRED EMBODIMENT

Figure 1:
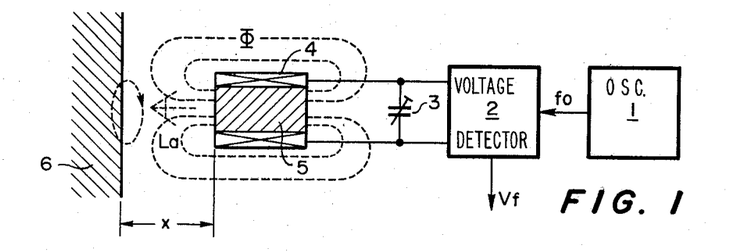
FIG. 1 is a block diagram showing the principle of an abnormality-detecting device according to the present invention which is applied to the automobile brake system.
Figure 2:
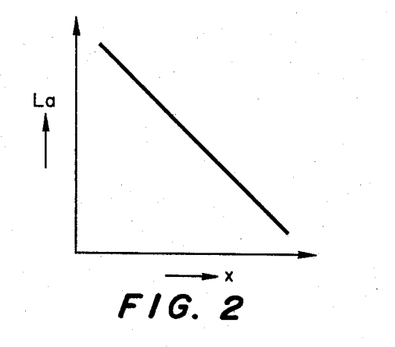
FIGS. 2, 3, 4 and 5, respectively, are characteristic curves of the device shown in FIG. 1.

FIG. 1 explicates the principle of an abnormality-detecting device for use in a brake system according to the invention, wherein a high frequency oscillation circuit 1 for generating an alternating current of a predetermined constant frequency $f_0$ is connected, through a circuit 2 for detecting a voltage variation, to a resonance circuit consisting of a variable capacitor 3 and a pick-up coil 4. The pick-up coil 4 has a core of magnetic substance 5 of a thermomagnetic material, the end surface of the core being opposed adjacently to a member 6, with the axis of the coil extending substantially perpendicular to the member 6. The inventive principle will now be described as applied to the detection of the displacement or the change in the gap width $x$ between the pick-up coil 4 and the member 6. Since a high frequency current from the oscillation circuit 1 is supplied to the pick-up coil 4, there is provided magnetic flux $\phi$ around the coil, as shown in FIG. 1. When the member 6 is made of a magnetic flux absorptive material such as an electric conductor or magnetic substance, there will occur in the member 6 eddy-current losses or hysteresis losses as the magnetic flux $\phi$ changes alternately. The rate of these eddy-current losses and hysteresis losses is determined by the conductivity or permeability of the member 6 or the like. The losses result in absorption of the energy reserved by the pick-up coil 4 thus causing a coil loss $La$. This coil loss $La$ is inversely proportional to the gap width $x$, as represented by a characteristic curve of FIG. 2. With reference to FIG. 2, it will be noted that in order to improve the sensitivity of detection the member 6 is preferably made of a material having a higher coefficiency of loss such as aluminum, iron or copper, or a magnetic material such as ferrite.

Figure 3:
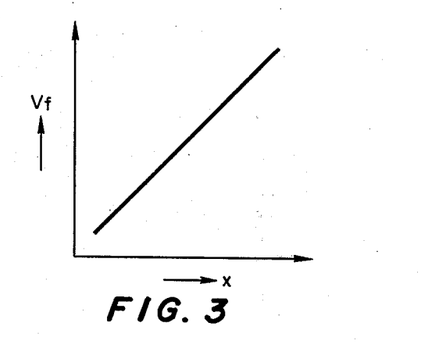

Again in FIG. 1, referring to the parallel resonance circuit consisting of the pick-up coil 4 and the variable capacitor 3, this circuit is so designed that with a certain reference or standard value of gap width $x$, the circuit will have a resonant frequency identical to the frequency $f_0$ generated by the circuit 1. With this arrangement, now, when there occurs a displacement or change in the gap width $x$, the coil loss $La$ of the pick-up coil 4 will be changed accordingly as described previously, and the displacement or the change in the gap width $x$ can thus be detected in terms of a change in the value of coil inductance. Consequently, the resonant characteristic of the resonance circuit changes, and due to invariableness of the frequency $f_0$ being generated this will result in a change in the voltage amplitude Vf of a high frequency signal through the circuit 2 for detecting the voltage variation. Thus, the output voltage Vf of the circuit 2 for detecting the voltage variation may be detected as a value which is proportional to the gap width $x$, as shown in FIG. 3.

In the above FIG. 1 showing the principle of the invention, the pick-up coil 4 is illustrated as having a magnetic core 5. The magnetic core 5 is made of a thermomagnetic material to be able to make temperature measurements in the brake system. Generally, in the brake system which achieves a braking operation by use of frictional forces produced by engagement between the brake rotary member (brake drum) and the brake lining (frictional member of the brake shoe), there tends to be produced a great amount of frictional heat in each brake application. The frequent or continuous use of the brake system over lengthy hours, accordingly, may happen to cause an accumulation of heat energies around the brake system without sufficient dissipation of heat therefrom so that the brake system is subjected to a drastic temperature rise. Also, the resultant temperature rise in the brake lining element causes the so-called "fading" wherein the coefficient of friction on the surface of the lining is lowered thus incurring an extreme reduction in the braking force available. Still also, due to the temperature rise in the brake system the brake oil in use is heated up to produce foams in it so that there occurs "vapor lock" wherein the working pressure of the piston means to actuate the brake shoe suddenly drops.

Figure 4:
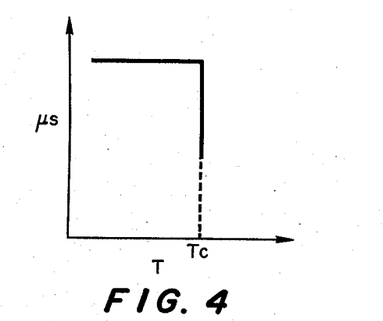
Figure 5:
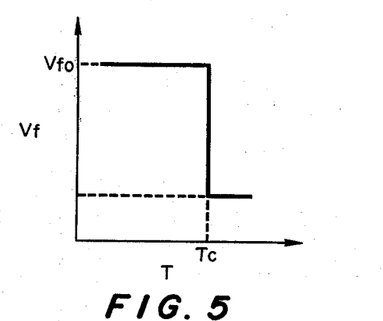

As described above, the temperature rise exceeding a certain level occurring in the brake system of the automobile or the like may have an exceedingly perilous affect on the operation of car driving. However, according to the invention, it is made possible to sense such temperature rise in the brake system easily by employing a thermomagnetic material as the magnetic core 5 shown in FIG. 1. The thermomagnetic material consists of a ferromagnetic material. To describe more theoretically, any thermomagnetic material presents an abrupt drop in its specific permeability $\mu s$ at a curie point Tc, as shown in FIG. 4, which is commonly accepted in the field of an electric theory, and the coil inductance is proportional to the specific permeability. In the arrangement of FIG. 1 incorporating a magnetic core 5 made of thermomagnetic material, when the temperature T of the magnetic core 5 reaches its curie point Tc, the inductance of the pick-up coil 4 and the output voltage amplitude Vf of the circuit 2 for detecting a voltage variation drop in an abrupt manner. This relation between the temperature T and the voltage amplitude Vf is represented by a characteristic curve T-Vf of FIG. 5.

With such a thermomagnetic core 5 incorporated in the abnormality-detecting device for an automobile brake system according to the present invention, therefore, the output voltage Vf of the circuit 2 for detecting the voltage variation actually includes both of the two signals for the displacement or the change in gap width and temperature changes. However, it is possible in practice to discriminate between those two signals, by pre-setting the temperature signal as greater than the gap-width signal in potential level, and by taking advantage of the fact that the necessary step of detecting changes in the gap width $x$ is only done when braking is applied in the case of application to an automobile.

Figure 6:
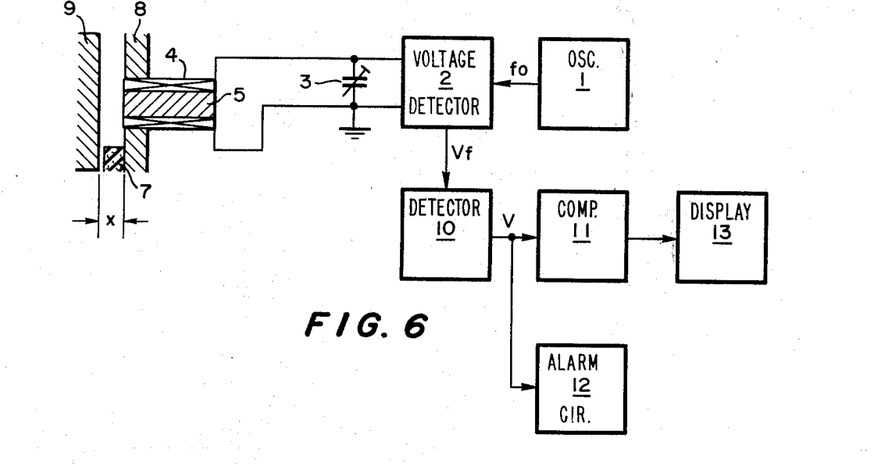
FIG. 6 is a block diagram similar to FIG. 1 however with a more particularized arrangement.

FIG. 6 shows a block diagram similar to FIG. 1 however showing a more particularized arrangement of the invention being applied to the automobile brake system. In FIG. 6, the pick-up coil 4 is secured to a brake shoe 8 on which a brake lining 7 is affixed, and the brake shoe 8 is spaced by a distance of $x$ from the brake drum 9. It is functionally arranged such that in a displacement-sensing circuit including the circuit 2 for detecting the voltage variation and a detector circuit 10, the high frequency components of the output voltage Vf from the circuit 2 is eliminated by the detector circuit 10, and the resultant output D.C. voltage V being applied to comparator circuit 11 and also to alarm circuit 12. To the comparator circuit 11, is connected a display circuit 13 which may comprise an indicating meter or buzzer or lamp, etc.

Figure 7:
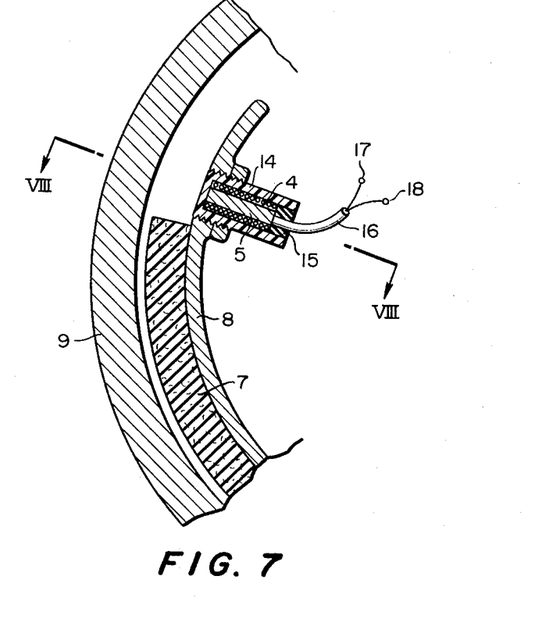
FIG. 7 is a partial cross-sectional view in which an abnormality-detecting device according to the present invention is mounted in the brake system.
Figure 8:
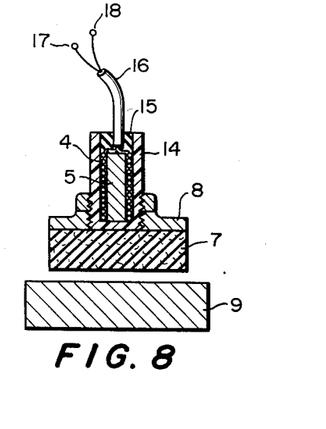
FIG. 8 is a cross-sectional view taken along the line VIII—VIII of FIG. 7.

In FIGS. 7 and 8, there is illustrated one preferred embodiment according to the present invention in which the abnormality-detecting element including the pick-up coil 4 and the magnetic core 5 is mounted in the drum-type brake system. As well known, the brake shoe 8 with a lining 7 secured thereto is disposed in adjacent, faced relation to the inner surface of the brake drum 9, and it is functionally arranged that the brake shoe 8 is urged against the brake drum 9 by the action of piston means not shown. FIGS. 7 and 8 show an inoperative position of the brake system. At the time of brake application, the brake shoe 8 expands or moves outwardly to make the lining 7 into frictional engagement with the brake drum 9 for performance of a brake operation. According to this embodiment, the brake shoe 8 is provided with a casing 14 made of synthetic resins such as phenolic resins and fixed in the shoe 8 by any suitable means, e.g. by screws or bonding. The outer end of the casing 14 is substantially in alignment with the outer periphery of the brake shoe 8 and opposed to the brake drum 9. Within this casing 14, the pick-up coil 4 having the thermomagnetic core 5 is embedded by use of a proper mold material 15. Terminals 17 and 18 are connected to the pick-up coil 4 through a cable 16.

As is apparent from FIGS. 7 and 8 and preceding circuits, the amount of wear of the brake lining 7 can be detected by converting a gap width between the shoe and the drum into the inductance variation of the pick-up coil 4, when the brake is applied.

Also, in this arrangement, any temperature rise in the brake system caused from frictional heat occurring between the brake drum 9 and the shoe lining 7 is transmitted, through the shoe 8 and the casing 14, to the thermomagnetic core 5. Accordingly, when the temperature of the thermomagnetic core reaches its curie point Tc, the pick-up coil 4 shows an abrupt drop in the value of inductance. In this manner, it is possible to detect the occurrence of any predetermined temperature rise critical to the brake system in terms of the inductance variation in the pick-up coil, by selecting the curie temperature of the magnetic core accordingly.

Figure 9:
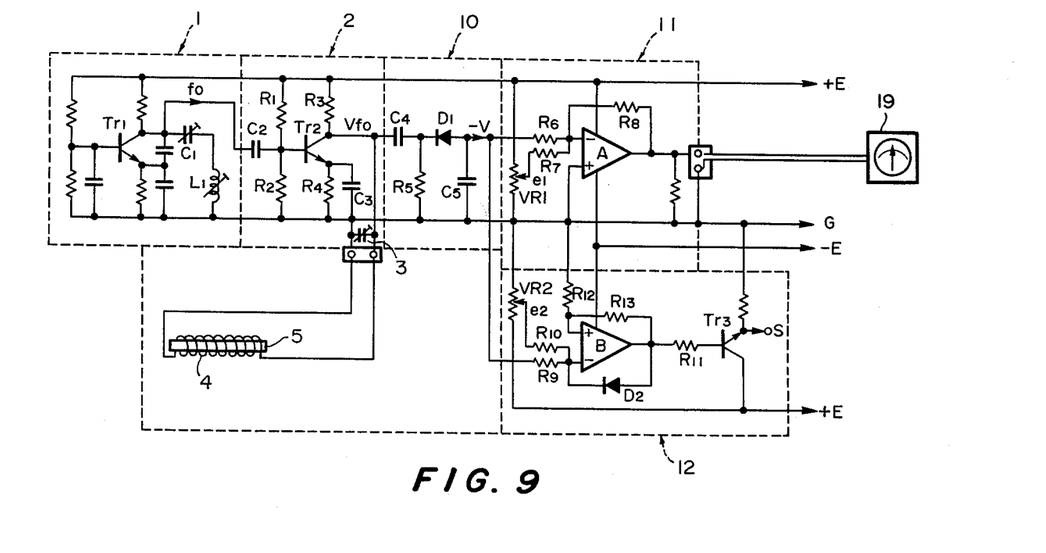
FIG. 9 is a circuit similar to FIG. 6 however with a still more particularized arrangement.

FIG. 9 shows a still further circuit of more detailed arrangements according to the invention. As shown in this Figure, it is functionally arranged such that output signals from the high frequency oscillation circuit 1 of an LC-type oscillator which is composed of a transistor $Tr_1$, capacitor $C_1$ and coil $L_1$, are applied via a capacitor $C_2$ to the circuit 2 for detecting a voltage variation composed of transistor $Tr_2$, capacitor $C_3$ and resistors $R_1$, $R_2$, $R_3$, $R_4$; and the circuit 2 in turn sends its output via a capacitor $C_4$ to the detector circuit 10 which is composed of a diode $D_1$, resistor $R_5$ and capacitor $C_5$, while the output side of the circuit 2 being in connection to the parallel resonance circuit consisting of the capacitor 3 and pick-up coil 4. The above circuit 2 for detecting a voltage variation and detector circuit 10 together form a displacement-sensing circuit. The parallel resonance circuit has been so designed that its resonant frequency accords with the generated frequency $f_0$ from the circuit 1 as long as the gap width effective in each brake application or the wear amount in the lining element does not exceed a predetermined value and the brake system has a normal temperature. Under such normal conditions as described of the brake system, therefore, the output voltage from the circuit 2 for detecting a voltage variation will be maintained substantially as a constant value of $Vf_0$ while the resonance circuit representing its characteristic state with a resonant frequency of $f_0$.

However, when either a decrease in the gap width $x$ or rise in temperature results in an inductance drop of the pick-up coil 4, there will occur a decrease in impedance Z of the resonance circuit which acts as a load to the circuit 2. Further, the input voltage $Vf$ to be applied to the detector circuit 10 is given as:

$$Vf = Vf_0 \frac{Z}{Z_0 + Z}$$

wherein $Z_0$ is output impedance of the circuit 2. In consequence, an inductance variation in the pick-up coil 4 is converted into a variation in the voltage $Vf$.

In the circuit of FIG. 9, again, it is arranged such that a D.C. voltage $-V$ provided by the detector circuit 10 of the displacement-sensing circuit is applied to the comparator circuit 11 through an input resistor $R_6$, and also to the alarm circuit 12 through an input resistor $R_9$. The comparator circuit 11 includes a differential-type operational amplifier A and a feedback resistor $R_8$, a level voltage $+e_1$ being applied to the minus input terminal of the amplifier A by means of resistors $VR_1$ and $R_7$, and it is zero adjusted in such a manner that an indicating meter or voltage meter 19 reads a maximum value when the thickness of the brake lining 7 corresponds to the predetermined value.

With the above described arrangement, it will be seen that as the brake lining 7 wears off gradually through long use of the brake system, the input $-V$ to the amplifier A is decreased proportionally, and as a result the output of the amplifier A is detected as a drop in the output voltage $+V$, that is a lower reading by the indicating meter 19, by the action of inverting amplification. Thus, it is possible to detect the amount of wear in the brake lining 7 or its reduced thickness simply by reading out the indication of the meter 19. In practice, the meter 19 may conveniently be installed on the dashboard of the automobile or the like so that the driver is able to be informed of the amount of wear of the brake lining at any time, whether running or not. It will of course be understood that in place of the meter 19 a buzzer or lamp means may be used to the same purpose.

Reference will now be made to the alarm circuit 12 of FIG. 9, said circuit is designed so as to perform its function when the increasing amount of wear in the brake lining 7 reaches a limit value or the temperature of the brake system is elevated to a critical level that may cause "fading". The alarm circuit 12 includes a differential-type operational amplifier B, a diode $D_2$ and resistors $R_{12}$, $R_{13}$ with an arrangement that by means of resistors $R_{10}$ and $VR_2$, the operational level of the amplifier B has been set at a level voltage $e_2$ lower than the level voltage $e_1$ set by the variable resistor $VR_1$, and the output of the amplifier B is applied through an input resistor $R_{11}$ to an output transistor $Tr_3$ to produce an output signal $S_1$. Since the level voltage $e_2$ has been set the same as a voltage of $|-V|$ that would be produced when the amount of wear in the brake lining 7 shows a maximum limit, a negative voltage $-V + e_2$ is applied to the minus input terminal of the amplifier B before the amount of wear in the brake lining reaches the maximum limit. Therefore, the diode $D_2$ becomes conductive, the amplifier B generates an output of "$o$" in the binary manner, and hence no signal $S_1$ is sent out. However, when the amount of the lining wear reaches the limit value, the value of $|-V|$ becomes smaller than the level voltage $e_1$, and hence a positive voltage is applied to the input terminal of the amplifier B. Thus, the diode $D_2$ becomes non-conductive, and the amplifier B generates an output of "1" in the binary manner so that the signal $S_1$ is generated from the output transistor $Tr_3$.

Meanwhile, as regards the thermomagnetic core 5 in the resonance circuit, it has been designed that the curie point of the thermomagnetic core 5 is selected to correspond to a critical level which will cause "fading" or "vapor lock" in the brake system. Accordingly, in the event the temperature of the brake system should reach such critical level, this level ("fading" or "vapor lock") may immediately be detected as a drop in the voltage $|-V|$. Further, since the inductance drop in the pick-up coil 4 at the curie point or the drop in the voltage $|-V|$ is far more drastic than that due to the lining wear, the alarm circuit does not fail to be activated to produce the output signal $S_1$ in such event.

In FIG. 9, both of the two steps of detecting the displacement or the change of the gap width and temperature change are processed by the common alarm circuit 12. However, there may be additionally provided a separate alarm circuit for exclusive use to detect temperature changes so that the gap width and temperature changes can be detected individually or independently of each other since the output voltage drop occurring when the brake system reaches the critical temperature is substantially greater than that occurring when the lining wears.

Further, FIG. 9 shows one preferred embodiment of the invention as applied to a single brake system, however the invention may equally be applicable to four brake systems in the front and rear wheels of the automobile for purposes of detecting the wear amount of the lining and abnormal temperatures in the systems.

Figure 10:
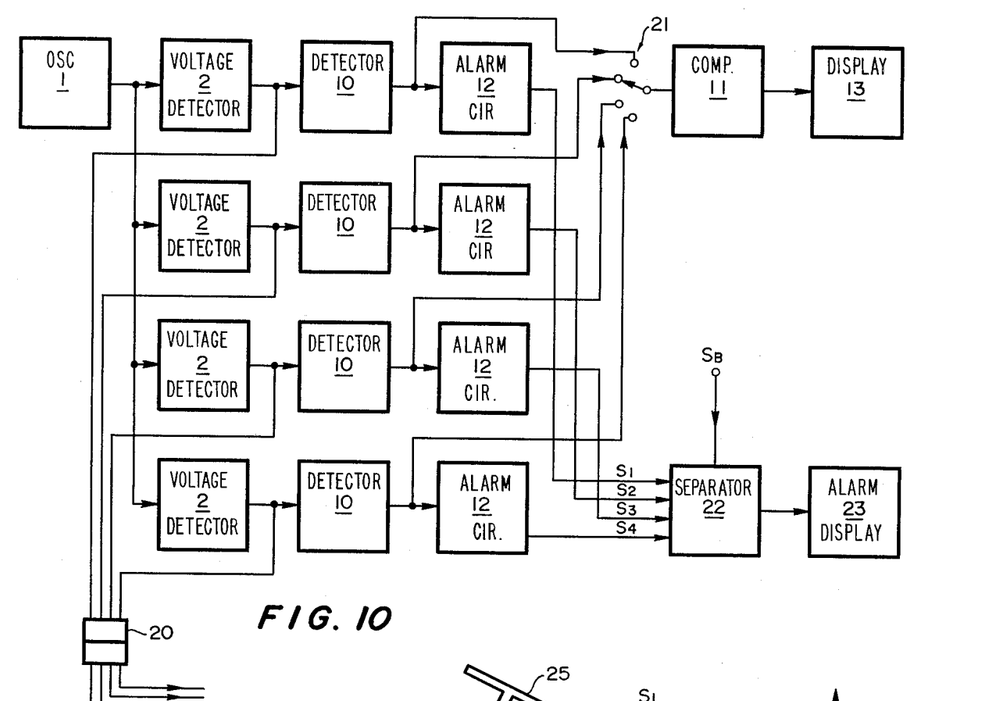
FIGS. 10, 11 and 12, respectively, are functional diagrams showing comparison and split processes applicable to the circuit of FIG. 9.

FIG. 10 shows such preferred embodiment in a block diagram.

According to the arrangement of FIG. 10, a common high frequency oscillation circuit 1 supplies a high frequency signal to each one of four processing circuits which respectively comprise displacement-sensing circuits including circuits 2 for detecting the voltage variation and detector circuits 10, and alarm circuits 12. The output of each circuit 2 is supplied through a connector 20 to the pick-up coil (now shown) mounted in the respective wheel. Signals from the respective detector circuits 10 based on the wear amount in the brake lining are applied one after another to a common comparator circuit 11 by the action of a changing-over switch 21, thereby activating the display circuit 13. Respective output signals $S_1$, $S_2$, $S_3$ and $S_4$ from the alarm circuits 12 are sent to an alarm display circuit 23 through a separator circuit 22 to which a brake signal $S_B$ has been applied. In this manner, the two kinds of signals for wear and temperature rise are separated from each other for individual display purposes. The function of the above separation will be apparent from FIG. 11. In this arrangement the arrangememt is such that signals $S_1$, $S_2$, $S_3$ and $S_4$ from the alarm circuit respectively are applied to "AND" circuits 24 of a decision circuit to which in turn are applied the brake signals $S_B$ from a brake signalling circuit consisting of a switch 26 which close when the brake pedal 25 is pressed, a power source 27 and a load resistance 28.

In an abnormally-detecting device for a brake system according to the present invention, the amount of wear in the brake lining can be detected by measuring the gap width between a frictional braking element and a braking rotary element only when the brake is applied. Therefore, when the brake is not applied, even if the output signal S is generated from the alarm circuit, this signal S does not indicate that the amount of wear in the brake lining reaches a limit value, but it indicates the occurrence of dangerous conditions in the brake system such as "fading" or the like due to the critical temperature rise in the brake system.

Figures 11, 12:
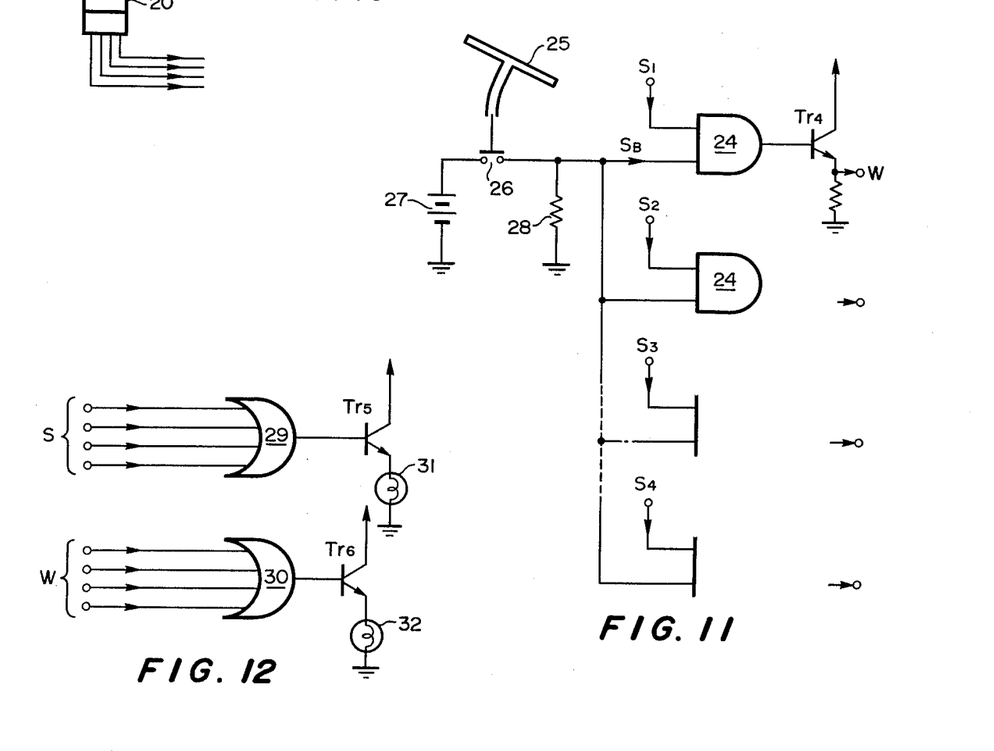

The discrimination or separation described above is functionally defined more specifically in a manner that for each system the brake signal $S_B$ is used as a gate signal to activate a transistor $Tr_4$ to send out a signal W. The thus provided four signals W indicative of critical limits of wear in the respective linings and the same number of temperature-rise signals S are, as shown in FIG. 12, applied through "OR" circuits 29 and 30 to transistors $Tr_5$ and $Tr_6$ to activate them respectively, so that the occurrence of critical conditions in any brake system may be indicated by respective alarm lamps 31 and 32.

Figure 13:
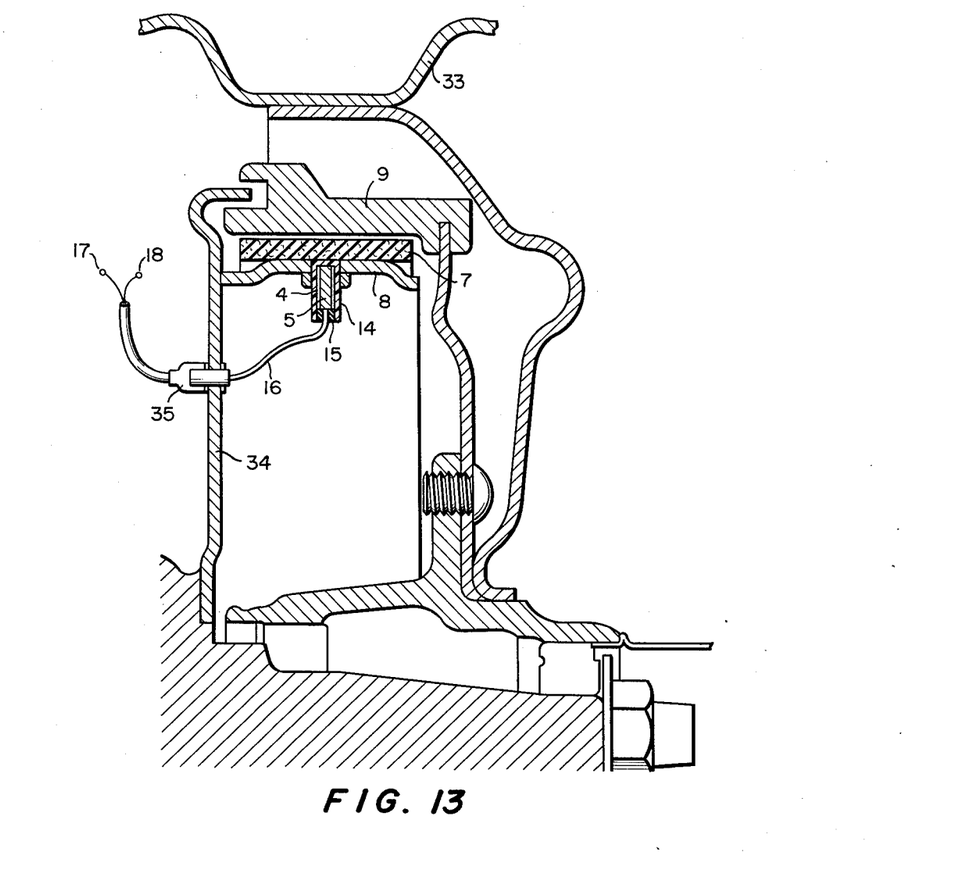
FIG. 13 is a partial longitudinal section in which an abnormality-detecting device is mounted in the brake system.

FIG. 13 shows a preferred embodiment in which the detecting element of the inventive abnormality-detecting device is mounted in the brake system. The sensing element composed of the pick-up coil 4 and thermomagnetic core 5 is shown as secured to the brake shoe 8 in the same manner as FIGS. 7 and 8. As known, the brake drum 9 rotates along with the wheel 33. Terminals 17 amd 18 for the pick-up coil 4 are provided and extended away from the pick-up coil 4 by means of a connector 35 fixed on the brake cover 34, so that the pick-up coil 4 is in connection to the displacement-sensing circuit not shown, said circuit is provided in the body of an automobile.

Figure 14:
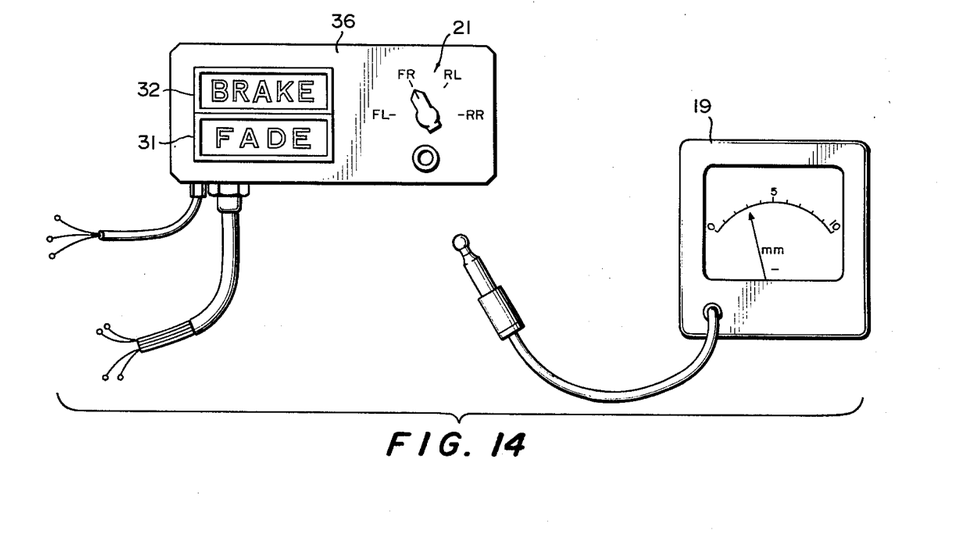
FIG. 14 is a schematic view of display means.

Finally, FIG. 14 is a preferred embodiment of the display means mounted on the dashboard for example of an automobile. As shown, the alarm display part 36 has a symbol letter "BRAKE" which is to be illuminated by the alarm lamp 32 (See also FIG. 12.) for indication of the wear limit in the lining, and also a further symbol letter "FADE" which is to be illuminated by the temperature-rise alarm lamp 31. The display part 36 also has the changing-over switch 21 which has been described with reference to FIG. 10. The switch 21 functionally serves to select or pick up signals from the wheels individually, as for example marked "FR(front wheel on the right)", "FL(front wheel on the left)", "RL(rear wheel on the left)", and "RR(rear wheel on the right)", for the purpose of detecting the amount of wear that has occurred in the respective brake linings when the vehicle is inspected or overhauled. The indicating meter 19 thus reads the presently remaining thickness of each lining element.

It is to be understood, further, that although the invention has so far been described with an oscillator of the type for generation of a fixed frequency, the invention may comprise a tunable type oscillator for generating a frequency proportional to the inductance variation of said pick-up coil, and said displacement-sensing circuit comprising a frequency-voltage converter interconnected to said tuning type oscillator and resonance circuit for converting a frequency signal to a voltage signal proportional to the frequency of said frequency signal.

As will be fully understood from the foregoing description, the abnormality-detecting device for use in the vehicle brake system according to the present invention has the novel features that the pick-up coil is very small, simple and compact in structure; it can easily be incorporated within the brake system; and it also can detect the displacement or the change in the thickness of the frictional lining member in any instance of brake application yet without causing any deterioration of the braking capacity.

Further, the inventive abnormality-detecting device for use in the brake system is particularly suited to detect the amount of wear occurring in the frictional brake lining member of the brake system used in an automobile and the like, and therefore is of high utility in the assurance of a safe drive by car.

Still further, the invention makes it possible to sense temperature rises in the brake system so as to prevent any occurrence of functional abnormalities such as "fading", "vapor lock", etc., in the brake system, hence giving assurance to a safe drive by car.

The foregoing description has been extended for the purpose of giving a full understanding of the invention as most preferably practiced in the vehicle brake system, however it has to be noted that the invention is equally applicable to any other machinery or equipment.

It will of course be understood that although the invention has been described as particularly illustrated in the Figures of the drawings, it is in no way limited to those specified embodiments but includes all changes and modifications apparent to those skilled in the art that do not deviate from the true spirit and scope of the invention.

What is claimed is:

1. In a vehicle brake system of the type comprising a braking rotary element of magnetic flux absorbing material which is adapted for rotation together with a wheel of a vehicle, a brake shoe disposed adjacent to said braking rotary element, faced relative to said braking rotary element and having a braking frictional lining element thereon, and an abnormality-detecting device for sensing the existence of an abnormal condition in said vehicle brake system, the improvement comprising:

a resonance circuit comprising a pick-up coil wound about a core made of a thermomagnetic material secured to the brake shoe for detecting a thickness displacement of and a temperature change in said braking frictional lining element of said brake shoe as a variation of the inductance in said pick-up coil and a capacitor in parallel connection to said pick-up coil;

a high frequency oscillation circuit for generating a predetermined frequency;

a sensing circuit coupled to said high frequency oscillation circuit and to said resonance circuit for converting variation of the inductance in said pick-up coil into electric signals; and an indicator means connected to said sensing circuit, for indicating said thickness displacement of and warning of a critical temperature rise in said braking frictional lining element in response to said electric signals.

2. An abnormality-detecting device according to claim 1, further comprising a comparator circuit coupled to said sensing circuit and to said indicator means, for comparing electronic signals from said sensing circuit with a predetermined reference value and for applying a signal corresponding to the amount of wear and a critical temperature rise of said braking frictional lining element to said indicator means.

3. An abnormality-detecting device according to claim 1, wherein said indicator means comprises an alarm device connected to said sensing circuit for warning of an abnormal condition of the brake system.

4. An abnormality-detecting device according to claim 1, further comprising a comparator circuit coupled to said sensing circuit and to said indicator means, for comparing electronic signals from said sensing circuit with a predetermined reference value and applying a signal corresponding to the amount of wear and a critical temperature rise of said braking frictional lining element to said indicator means, and wherein said indicator means comprises an alarm device connected to said sensing circuit for warning of an abnormal condition of the brake system.

5. An abnormality-detecting device according to claim 4, wherein said high frequency oscillation circuit comprises a high frequency oscillator for generating a predetermined constant frequency which is identical to a resonant frequency provided by said resonance circuit when the brake system is under normal conditions with respect to the amount of wear of the braking frictional lining element and also temperature in the brake system.

6. An abnormality-detecting device according to claim 4, wherein said high frequency oscillation circuit comprises a tunable type oscillator for generating a frequency proportional to the variation of the inductance of said pick-up coil, and said sensing circuit comprises a frequency-voltage converter interconnected to said tunable type oscillator and to said resonance circuit for converting a frequency signal to a voltage signal proportional to the frequency of said frequency signal.

7. An abnormality-detecting device according to claim 5, wherein
said capacitor of the resonance circuit is of variable capacitance so as to vary the resonant frequency of said resonance circuit.

8. An abnormality-detecting device according to claim 5, wherein
said sensing circuit comprises:
a circuit for detecting a voltage variation having an input and an output, said input being coupled to said high-frequency oscillator; and
a detector circuit coupled to the output of said circuit for detecting a voltage variation and generating said electronic signals.

9. An abnormality-detecting device according to claim 5, wherein
said thermomagnetic core of said pick-up coil is made of iron.

10. An abnormality-detecting device according to claim 9, wherein
said capacitor constituting the resonance circuit is of variable capacitance so as to vary the resonant frequency of said resonance circuit; and
said sensing circuit comprises:
a circuit for detecting a voltage variation having an input and an output, said input being coupled to said high-frequency oscillator; and
a detector circuit coupled to the output of said circuit for detecting a voltage variation and generating said electronic signals.

11. An abnormality-detecting device according to claim 10, wherein
said pick-up coil is securely fixed to the brake shoe with the central axis of the coil extending substantially perpendicular to the braking rotary element.

12. An abnormality-detecting device according to claim 11, wherein
said pick-up coil is fixedly embedded in a casing fixed in the brake shoe.

13. An abnormality-detecting device according to claim 12, wherein
said resonance circuit is so formed that the pick-up coil fixed in the brake shoe of the brake system be in parallel connection, via a cable means, to the capacitor mounted in the vehicle.

14. An abnormality-detecting device according to claim 13, wherein
said high frequency oscillator comprises an LC oscillator;
said sensing circuit comprises:
a circuit for detecting a voltage variation comprising a transistor having a base, emitter and collector, said base being coupled to said LC oscillator by a capacitor, said emitter being coupled to a ground via the parallel combination of a capacitor and a resistor, said base further being connected to a source of D.C. Voltage by a resistor and being connected to said ground by a resistor, said collector being coupled to the source of D.C. Voltage by a resistor;
a detector circuit comprising a diode having a cathode end connected to said collector of said transistor by a capacitor, a resistor connecting said cathode end to ground, and a further capacitor connected between an anode of said diode and ground;
said comparator circuit comprises an operational amplifier having a feedback resistor connected respectively between said amplifier's output and minus input, a resistor connected between the anode of said diode and said minus input of said amplifier, a variable resistor connected between the source of positive D.C. voltage and ground and having a variable resistor wiper arm connected by a resistor to said minus input;
said indicator means further comprises a voltage meter, said meter coupled to the output of said amplifier; and
said alarm device comprises an alarm circuit having a differential type operational amplifier which is connected to said detector circuit and compares the electronic signals from the sensing circuit with a predetermined level voltage so that when the thickness of the braking frictional lining element reaches a limit value, an output signal is produced.

15. An abnormality-detecting device according to claim 14, further comprising:
a pick-up coil of a resonance circuit mounted in each wheel of the vehicle.

16. An abnormality-detecting device according to claim 15, further comprising:
a plurality of said sensing circuits and a plurality of said alarm circuits each respectively coupled to one of said pick-up coils, the electronic signals from each of said sensing circuits being applied in sequence to said comparator circuit through a changing-over switch.

17. An abnormality-detecting device according to claim 16, wherein
each of said sensing circuits are coupled to said high frequency oscillation circuit.

18. An abnormality-detecting device according to claim 17, further comprising
four decision circuits, each of said decision circuits comprising an AND gate circuit of which one terminal has an output signal from one of said alarm circuits applied thereto and a switching transistor connected to said AND gate; a switch connected to said decision circuits and operatively connected to a brake pedal mounted in said vehicle.

19. An abnormality-detecting device according to claim 18, further comprising
a first OR gate circuit having the output signals from all of said alarm circuits applied thereto;
a second OR gate circuit connected to all of said switching transistors of said decision circuits;
a first switching transistor connected to said first OR gate circuit and an alarm lamp; and
a second switching transistor connected to said second OR gate circuit and an alarm lamp.

* * * * *